United States Patent [19]

Broder et al.

[11] Patent Number: 5,032,987
[45] Date of Patent: Jul. 16, 1991

[54] SYSTEM WITH A PLURALITY OF HASH TABLES EACH USING DIFFERENT ADAPTIVE HASHING FUNCTIONS

[75] Inventors: Andrei Z. Broder, Mountain View; Anna R. Karlin, Stanford, both of Calif.

[73] Assignee: Digital Equipment Corporation, Maynard, Mass.

[21] Appl. No.: 522,458

[22] Filed: May 11, 1990

Related U.S. Application Data

[63] Continuation of Ser. No. 228,374, Aug. 4, 1988, abandoned.

[51] Int. Cl.[5] .......................... G06F 12/02; G06F 7/38
[52] U.S. Cl. .................................. 364/200; 364/260.4; 364/261.2; 364/262
[58] Field of Search ... 364/200 MS File, 900 MS File

[56] References Cited

U.S. PATENT DOCUMENTS

| | | | |
|---|---|---|---|
| 4,063,220 | 12/1977 | Metcalf et al. | 340/825.5 X |
| 4,564,944 | 1/1986 | Arnold et al. | 364/200 X |
| 4,706,081 | 11/1987 | Hart et al. | 340/825.03 |
| 4,731,739 | 3/1988 | Woffinden et al. | 364/200 |
| 4,897,785 | 1/1990 | Ziiger | 364/200 |

FOREIGN PATENT DOCUMENTS

| | | |
|---|---|---|
| 0268373 | 5/1988 | European Pat. Off. |
| 0269978 | 6/1988 | European Pat. Off. |
| 60-211541 | 10/1985 | Japan |
| 60-211542 | 10/1985 | Japan |
| 60-254254 | 12/1985 | Japan |

OTHER PUBLICATIONS

Du et al., "The Study of a New Perfect Hash Scheme", IEEE Tran. Software Engineering, 5/1983, pp. 305–313.
Hawe, R. et al., "The Extended Local Area Network Architecture and LANBridge Loo", Digital Technical Journal, No. 3, Sep. 1986, pp. 54–72.
The Ethernet, A Local Area Network, Data Link Layer and Physical Layer Specifications, Version 1.0, Sep. 30, 1980.
M. Fredman, J. Komlos, E. Szemeredi, "Storing a Sparse Table with O(1) Worst Case Access Time", *Journal of the ACM*, vol. 31, No. 3, Jul. 1984, pp. 538–544.
A. V. Aho and D. Lee, "Storing a Dynamic Sparse Table", *27th IEEE Symposium on Foundations of Computer Science*, 1986, pp. 55–60.
L. Carter, M. Wegman, "Universal Classes of Hash Functions", *JCSS*, 18, No. 2, 1979, pp. 143–154.

*Primary Examiner*—Thomas C. Lee
*Attorney, Agent, or Firm*—Flehr, Hohbach, Test, Albritton & Herbert

[57] ABSTRACT

A data processing system and method particularly useful for network address lookup in interconnected local area networks uses a family of hashing algorithms that allow implementation of a dictionary that is particularly advantageous when the underlying hardware allows parallel memory reads in different memory banks. The system and method requires exactly one memory cycle for deletes and lookup and constant expected amortized cost for insertions. The system and method uses easy-to-compute hash functions and makes no unproven assumptions about their randomness properties, or about any property of keys drawn from a universe U. The system and method makes it possible to build a dictionary that is able to answer 20 parallel searches among 64,000 entries in less than 5 μs using relatively inexpensive hardware.

11 Claims, 4 Drawing Sheets

SYSTEM WITH A PLURALITY OF HASH TABLES EACH USING DIFFERENT ADAPTIVE HASHING FUNCTIONS

This is a continuation of application Ser. No. 07/228,374 filed Aug. 4, 1988 now abandoned.

BACKGROUND OF THE INVENTION

1. Field of the Invention

The present invention relates generally to a data processing system and method employing an improved form of hashing to provide a dictionary, i.e., a data structure that allows a sequence of on-line insertions, deletions and lookup operations for keys drawn from a universe U. More particularly, it relates to such a data processing system and method that is particularly advantageous when the system hardware allows parallel memory reads in different memory banks. Most especially, it relates to such a data processing system and method utilized in interconnected local area networks to direct information between addresses on the networks.

2. Description of the Prior Art

A variety of techniques for looking up network addresses in local area networks and interconnected local area networks are known in the art. Network address lookup imposes demanding requirements for large scale interconnected networks. For example, consider an Ethernet bridge, linking 20 Ethernets with a total of 50,000 stations. When an information packet comes to the bridge, the bridge hardware must read its destination and determine on which wire to send out the packet. It is desirable that packets arriving at the bridge suffer no delay. Since it typically takes 5 μs to receive a packet, the packets need to be re-routed at a rate of approximately 5 μs. However, we can assume that many (up to 20) packets come to the bridge simultaneously. Therefore, it is necessary to build hardware and algorithms that are able to answer 20 parallel searches among 50,000 entries in less than 5 μs.

SUMMARY OF THE INVENTION

These and related requirements may be met through use of the novel multilevel adaptive hashing system and method herein disclosed. A local area network system incorporating a hashing system in accordance with this invention has a plurality of local area networks interconnected by a bridge. The bridge includes a processor, program memory, address memory and packet memory. The memories are connected to the processor by a bus. Each of a plurality of interfaces connect the bus to one of the local area networks. The address memory is divided into a plurality of hash tables. Keys (network addresses) are mapped into each of the hash tables using a different random hash function for each of the tables. Each table also contains a lookup mechanism for determining if a new key (in this case a network address) being inserted into the table hashes to an occupied address in that table. If so, the key is processed by the next table, until the key is mapped into an unoccupied address in one of the hash tables. If a key cannot be inserted into any of the hash tables, new hash functions are tried until the key is inserted into an unoccupied address (or location) in one of the hash tables. Stored keys are retrieved by computing the hash functions for all the hash tables in parallel and doing a parallel read from the tables.

While the hashing system and method of this invention is particularly suited for looking up network addresses in interconnected local area networks, the advantages of the system and method should make it useful in a wide variety of other data processing contexts as well. A data processing system for on-line insertions, deletions and look-up operations in accordance with the invention includes a processor, program memory and data memory. The memories are connected to the processor by a bus. The data memory is divided into a plurality of tables. Keys (in this case data) are mapped into each of the hash tables using a different random hash function for each of the tables. Each table also contains a lookup mechanism for determining if a hashed key being inserted into the table is being hashed to a location (address) to which a previous (different) key has already been hashed. If so, the key is processed by the next table, until the key is mapped into an unoccupied address in one of the hash tables. If a key cannot be inserted into any of the hash tables, new hash functions are tried, until any empty location is found in one of the tables. Stored keys are retrieved by computing the hash functions for all the hash tables in parallel and doing a parallel read from the tables.

A data processing method for on-line insertions, deletions and look-up operations in accordance with the invention includes providing a data memory divided into a plurality of tables. A key (in this case data) is hashed into the tables using a different random hash function for each of the tables. It is determined if a hashed key being inserted into a first one of the tables is being hashed to a location (address) in the first one of the tables to which a previous (different) key has already been hashed. A key hashed to a location in the first one of the tables to which a previous key has already been hashed is hashed into a second one of the tables. It is determined if a hashed key being inserted into the second one of the tables is being hashed to a location in the second one of the tables to which a previous key has already been hashed. Keys which are hashed into occupied locations in each of the plurality of tables are hashed, using a new hash function, until an empty location is found in one of the tables. Stored keys are retrieved by computing the hash functions in parallel and doing a parallel read from the tables.

The attainment of the foregoing and related requirements, advantages and features of the invention should be more readily apparent to those skilled in the art, after review of the following more detailed description of the invention, taken together with the drawings, in which:

DETAILED DESCRIPTION OF THE INVENTION

Figure 1:
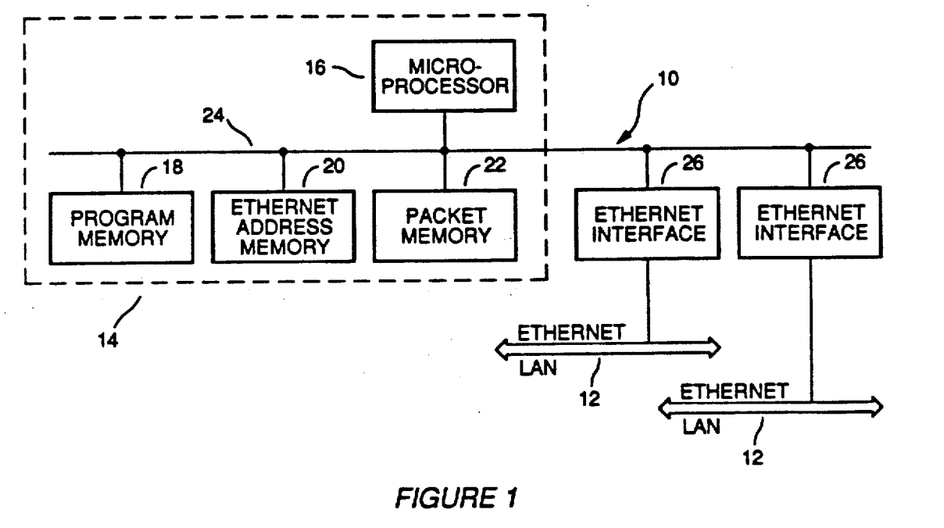
FIG. 1 is a block diagram of interconnected local area networks in which the present invention is employed.
Figure 2:
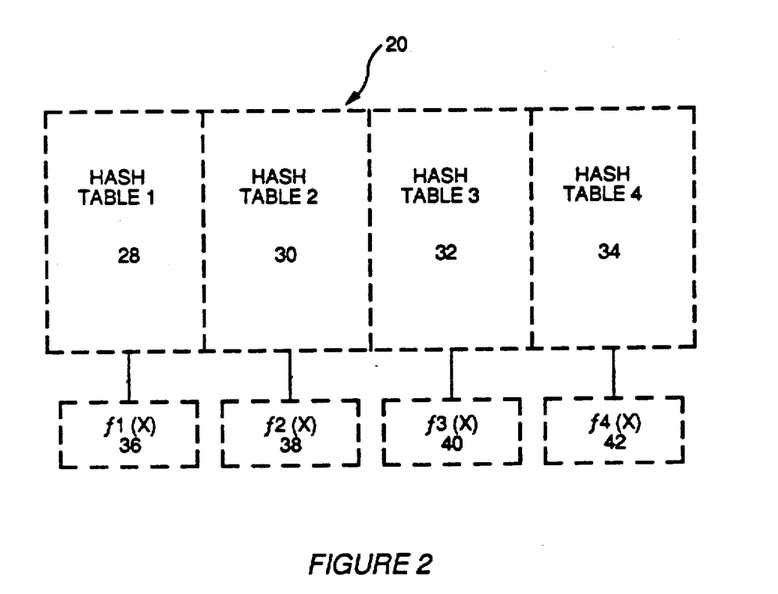
FIG. 2 is a more detailed block diagram of a portion of the networks in FIG. 1.

Turning now to the drawings, more particularly to FIGS. 1 and 2, there is shown an extended Ethernet local area network system 10 including a plurality of local area networks 12 interconnected by means of a bridge 14. The bridge 14 includes a processor 16, and program memory 18, Ethernet address memory 20 and packet memory 22, all connected to the processor 16 by bus 24. Interfaces 26 connect the bus 24 to the local area networks 12. The Ethernet address memory 20 is divided into a plurality of tables 28, 30, 32 and 34, each of which is accessed by a different hash function 36, 38, 40 and 42.

This invention will typically be used when the size n of the dictionary data structure is much smaller than the size of the universe U from which keys are drawn. Efficient dictionaries are implemented by various hashing schemes. Described below is a family of hashing algorithms that allow implementation of a dictionary that is particularly advantageous when the underlying hardware, as in the system 10, allows parallel hash function computations and parallel memory reads in different memory banks. In the above example, the present invention requires exactly one memory cycle for deletes and lookup and constant expected amortized cost for insertions.

In the system 10, the Ethernet address memory 20 is divided into k tables 28-34 of different sizes, with k typically being chosen to be c log log n for some positive, small constant c. The storage scheme consists in hashing all the keys into the first table 28 using a random hash function, constructed as explained below. If a collision occurs, i.e., if the key being inserted is hashed to a location already containing a key stored in the table 28, the offending key is hashed, with a different hash function, into the second table 30. Colliding elements in the second table 30 are rehashed into the third table and so on. An inserted key that collides with a key already stored in table i is said to *percolate* into table i+1.

Figure 4:
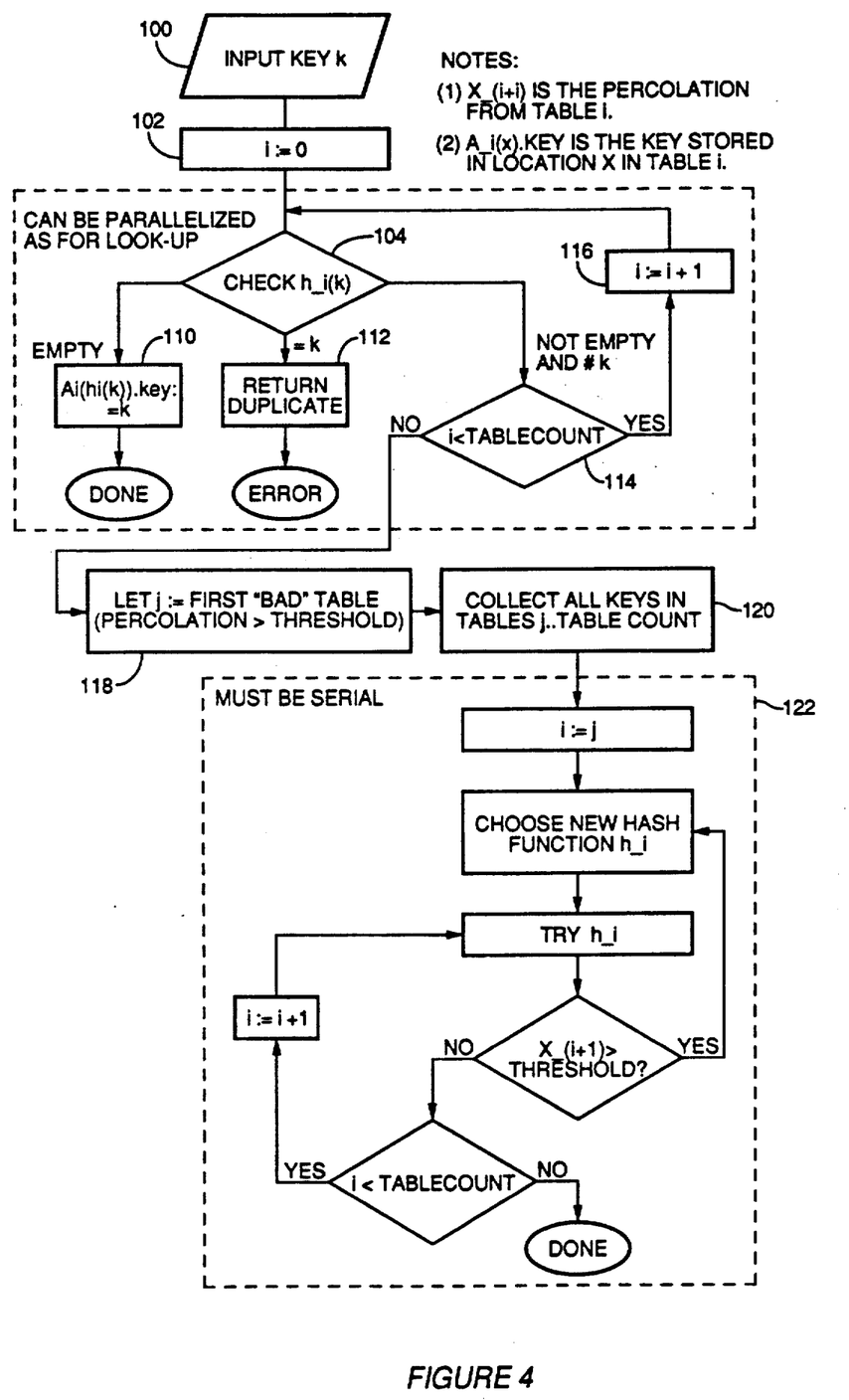
FIGS. 4–5 are software flow diagrams implementing portions of the hashing system and method of this invention.

Referring to FIG. 4, when a key k is to be added to the hash tables (box 100), the process begins with the first hash table (box 102) by hashing the key k using the hash function for the first table to compute an address value for the first table (box 104). If the location in the first table at that computed address is empty, the key k is stored there (box 110); if the key is already stored there (i.e., a duplicate of key k is stored in the computed location), this is an error and an appropriate error message is returned (box 112); finally, if the table location is already occupied (i.e., by a different key value), then, if there are any more hash tables left (box 114), we repeat the hashing and lookup process with the next table (box 116 and boxes 110 through 114).

Figure 3:
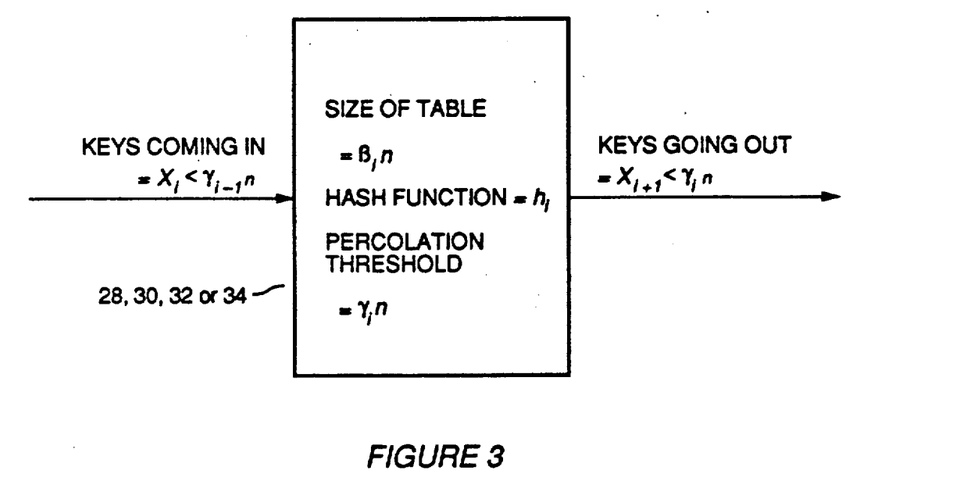
FIG. 3 is a combined block diagram and flow chart useful for understanding operation of the invention.

If a collision occurs in the last table 34, then we determine which is the first table that has "too many" collisions, i.e., the key exceeds a percolation threashold, discussed below (box 118), and we use a new hash function on that and subsequent levels (boxes 120 and 122). The expected number of re-hashings is small. The probability space here and in the following description is the set of choices for the random hash functions. For the purpose of this analysis, the keys are assumed to be chosen at the start by an adversary and are unknown to the algorithm. Further details of this process are shown in FIGS. 3 and 4. In FIG. 3, the table i can be any one of the tables 28-34 in FIG. 2.

Figure 5:
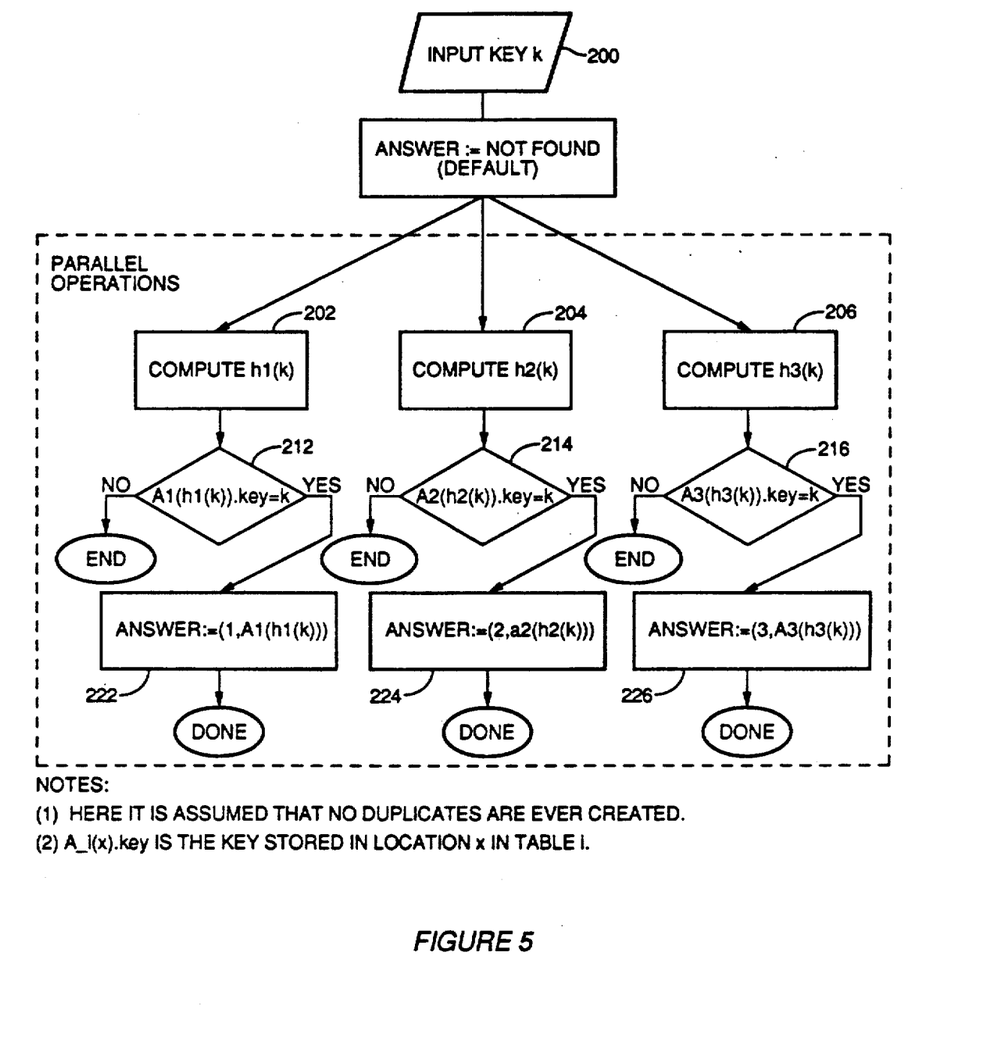

Referring to FIG. 5, to retrieve a key specified key (box 200) we compute all k hash functions (one for each table 28-34) in parallel (boxes 222, 224, 226) and then do a parallel read from the k tables and compare the read values with the specified key (boxes 212, 214, 216). We maintain the invariant that the tables do not contain duplicate keys. Hence, at most one of the parallel readers might execute a successful search and therefore they can use a single, common register to store the result of the search (boxes 222, 224, 226). (Only the successful reader, if any, will write into this register.)

To delete a key, we attempt to retrieve the key, thus determining where it is stored. We then mark the key in that location as "deleted".

We can treat locations containing "deleted" keys as empty or as occupied. If we treat such locations as empty, then an insertion of key K must be preceded by a retrieval in order to determine if K is already in the table. If we treat such locations as occupied, then when tables are reorganized (i.e., new hash functions are chosen), elements marked "deleted" will not be reinserted. The preferred method depends on the ratio between insertions and deletions.

The analysis in subsequent sections gives bounds on $E(R)$, the expected number of rehashings, when N insertions are executed starting from an empty table. Since retrievals and deletions never cause rehashings, this analysis implies that from the time a new set of random hash functions is chosen, if there are at most $k < N$ keys stored in the table, then the expected number of rehashings during a sequence of T insertions, assuming that the tables never contain more than $(1-\epsilon)N$ keys, where $0 < \epsilon < 1$, is less than $(T/(\epsilon N))E(R)$.

It is convenient for practical and theoretical reasons to have tables of size $2^j$ for some j. The functions for hashing into a table of size $2^j$ are of the form $$((A \cdot K + B) \bmod P1) \bmod P2)$$

where K is the key of length $d+1$, viewed as a polynomial of degree d over $Z_2$, A and B are random polynomials over $Z_2$ of degree d. P1 is a fixed irreducible polynomial of degree $d+1$, and P2 is a fixed polynomial of degree j. In practice, we can always use functions of the form $(A \cdot K \bmod P1) \bmod 2^j$ without any loss of performance. We make no unproven assumptions about the randomness properties of such functions, or any property of the keys.

Such functions can be very easily implemented in hardware: multiplication for polynomials just uses a standard multiply chip with no carries, + is just XOR, and "mod" P1 is a shift-back register, and "mod" $2^j$ is just a masking operation. The fixed polynomial P1 can be wired in. The random bits for A can be obtained either from a special circuit using Zener diodes or from a linear congruential generator which we let go continuously.

Let n be the number of keys. The performance of the scheme is determined by two parameters:

$\alpha$, the load factor. The total amount of memory used is $m = n/\alpha$.

k, the number of tables. This determines how many hash functions we need, and implicity how much hardware we need.

Given $\alpha$ and k, we compute
$\epsilon$, a positive parameter such that $$\epsilon^2 \left(1 - \frac{k}{2\epsilon}\right)^{\ln \frac{k}{\epsilon} - 1}$$

is an approximate upper bound on the expected total number of rehashings, that is the number of times during the serial insertions of all n keys, that a collision will happen in the last table. As an approximation, the parameter $\epsilon$ can be determined from the equation $$\frac{(2^k - 1)e}{(2a)^{2^k - 1}e^{2^k}} = n.$$

More precise estimations will be shown later.

For our standard example, using 4 tables, it means that if we use say 1 $\mu s$ to compute 20*4=80 hash functions in parallel, then we can store the data in 200 ns memory. Of course we can do some superposing of hash function computations and memory access to reduce the required hardware. A primary advantage of the invention compared to standard hashing methods is that we bound the length of the maximum chain by recomputing the hash functions, and the invention can take advantage of parallel hardware to access all the elements of the chain simultaneously.

In practice, it might make sense to use two separate sets of tables, and store all keys in each set. We define a *crisis* to be a collision in the last table. The probability that an insertion creates a crisis in both sets simultaneously is likely to be extremely small. If there is a crisis in just one set, we insert in the second set, and use only the second set while the first set is re-organized. If there is a crisis in both sets, we keep using one until the second one is re-organized and then switch sets.

We would like the hash functions we use to behave as if they were totally random mappings. Hence, we will be choosing hash functions from a small class of functions H with the following properties:

(1) Suppose that each function h ∈ H maps elements in $[0 \ldots N-1]$ into the range $[0 \ldots m-1]$. Then for h chosen uniformly at random from H, and any two elements $x_1, x_2 \in [0 \ldots N-1]$, and $y_1, y_2 \in [0 \ldots m-1]$, $$Pr(h(x_1) = y_1 \text{ and } h(x_2) = y_2) \leq 1/m^2. \quad (1)$$

A class of hash functions with this property is called *universal*.

(2) Each function h ∈ H is efficiently computable.

More generally, we say that a class of functions $H_k$ mapping elements in $[0 \ldots N-1]$ into the range $[0 \ldots m-1]$ is k-universal if for h chosen uniformly at random from $H_k$, and any elements $x_1, x_2, \ldots x_k \in [0 \ldots N-1]$, and $y_1, y_2, \ldots y_k \in [0 \ldots m-1]$, $$Pr(h(x_1) = y_1, h(x_2) = y_2, \ldots, h(x_k) = y_k) \leq 1/m^k. \quad (2)$$

We propose the following specific class as an efficient choice for a class of k-universal functions. Suppose that $N = 2^\mu$, $m = 2^\nu$ and S is the set of strings being hashed. To each string $s = (s_1, \ldots, s_\mu) \in S$, we will associate a polynomial $S(t)$ of degree $\mu - 1$ with coefficients in $Z_2$, given by $$S(t) = s_1 t^{\mu-1} - s_2 t^{\mu-2} - \ldots - s_\mu.$$

All arithmetic operations in this discussion of universal hashing are over $Z_2$.

Let $P(t)$ be an irreducible polynomial of degree $\mu$ with coefficients in $Z_2$. The set of polynomials (with coefficients in $Z_2$) taken modulo $P(t)$ forms a field of cardinality $2^\mu$ which is denoted by $Z_2^\mu[t]$. Each element of this field is represented by a $\mu$ bit binary string. Let $Q(t)$ be a polynomial over $Z_2$ of degree $\nu$, say $t^\nu$. We take the class of hash functions $H_k$ to be $$H_k = \Big\{ h : h(S(t)) = \Big( \sum_{0 \leq i \leq k-1} A(t)(S(t))^i \mod P(t) \Big) \mod Q(t) \text{ and } A(t) \in Z_2^\mu[t] \Big\}.$$

Note that $|H_k| = 2^{2\mu}$.

We show that when the class of functions is universal, i.e., the hash function is chosen uniformly at random in $H = H_2$, property (1) is satisfied. Consider any two strings $S_1$ and $S_2$ and their associated polynomials $S_1(t)$ and $S_2(t)$. Let $W_1(t)$ and $W_2(t)$ be any two distinct elements of $Z_2^\mu[t]$. Then there is a unique choice of $A(t)$ and $B(t)$ in $Z_2^\mu[t]$ such that $$(A(t)S_1(t) + B(t)) \mod P(t) = W_1(t) \quad (3)$$

$$(A(t)S_2(t) + B(t)) \mod P(t) = W_2(t).$$

Since there are $2^{2\mu - \nu}$ choices for $W_1(t)$ and $2^{2\mu - \nu}$ choices for $W_2(t)$, the total number of hash functions that map $S_1$ to $y_1$ and $S_2$ to $y_2$ is $2^{2\mu - 2\nu}$ and so the probability that a randomly chosen hash function in H does so is $\frac{1}{2^{2\nu}} = 1/m^2$.

It is also true that functions in H are efficiently computable. Computing $S'(t) = A(t)S(t) + B(t)$ is just multiplication (with no carries) and addition mod 2. Computing $S''(t) = S'(t) \mod P(t)$ can be done in time linear in the length of $S'(t)$ as follows. Suppose that $$f(s_1, \ldots, s_l) = (s_1 t^{l-1} - s_2 t^{l-2} - \ldots - s_l) \mod P(t)$$
$$= r_1 t^{\mu - 1} - r_2 t^{\mu - 2} - \ldots - r_\mu.$$

Then $$f(s_1, \ldots, s_{l-1}) = (f(s_1, \ldots, s_l)t + s_{l-1}) \mod P(t)$$
$$= r_2 t^{\mu - 1} - r_3 t^{\mu - 2} - \ldots +$$
$$r_\mu t - s_{l-1} - (r_1 t^\mu) \mod P(t).$$

Therefore, if we store the value of $t^\mu \mod P(t)$, computing $f(s_1, \ldots s_{l+1})$ from $f(s_2, \ldots s_l)$ just requires $\mu$ additions mod 2 and can be implemented in hardware with a shift-back register.

Computing $S''(t) \mod Q(t)$ is similar, but not needed in practice since, as mentioned earlier, we can take $Q(t) = t^\nu$. Similar arguments prove that the classes $H_k$ above, for $k > 2$, are k-universal.

Intuitively, the "more random" our hash functions are, the better we expect their performance to be. Below, we first obtain a bound on the total number of rehashings under the assumption that we use 2-universal functions, and then obtain a stronger bound assuming that the we use k-universal functions with $k \geq 4$.

PRELIMINARY LEMMAS

Lemma 1

Suppose that n keys, denoted $e_1, \ldots, e_n$, are hashed into a table of size $m = \beta n$ by a random function h in a k-universal class $H_k$, $k \geq 2$. Let $Y_{ij}$ be an indicator random variable whose value is 1 if and only if element $e_i$ hashes to the same location as element $e_j$, i.e., $h(e_i) = h(e_j)$. Let X be the random variable whose value is the number of pairwise collisions between elements, i.e., $X = \Sigma_{1 \leq i < j \leq n} Y_{ij}$. Then $$E(X) \leq \binom{n}{2}\frac{1}{m} = \binom{n}{2}\frac{1}{\beta n}.$$

Proof: Since H is k-universal for some $k \geq 2$, $E(Y_{ij}) \leq 1/m$. Hence $$E(X) = \sum_{1 \leq i \leq j \leq n} E(Y_{ij}) \leq \binom{n}{2}\frac{1}{m} = \binom{n}{2}\frac{1}{\beta n}.$$

Lemma 2

Suppose that n keys, denoted $e_1, \ldots, e_n$, are hashed into a table of size m by a random function in a k-universal class $H_k$, $k \geq 4$. Let $Y_{ij}$ be an indicator random variable whose value is 1 if and only if element $e_i$ hashes to the same location as element $e_j$, i.e., $h(e_i) = h(e_j)$. Let X be the random variable whose value is the number of pairwise collisions between elements, i.e., $X = \Sigma_{1 \leq i < j \leq n} Y_{ij}$. Then $$\text{Var}(X) = \frac{n^2}{2m} + O(1).$$

as $n \to \infty$ and $m = \beta n$ for a constant $\beta$.

Proof: Let $Z_{is}$ be an indicator random variable whose value is 1 if element $e_i$ hashes to position s. Observe that $Y_{ij} = \Sigma_{1 \leq s \leq m} Z_{is} Z_{js}$. We need to compute $$E(X^2) = E\left(\left(\sum_{1 \leq i < j \leq n} Y_{ij}\right)^2\right) = E\left(\left(\sum_{\substack{1 \leq i < j \leq n \\ 1 \leq s \leq m}} Z_{is} Z_{js}\right)^2\right)$$

$$= E\left(\sum_{\substack{1 \leq s, t \leq m \\ 1 \leq i < j \leq n \\ 1 \leq k < l \leq n \\ (i,j) \neq (k,l)}} Z_{is} Z_{js} Z_{kt} Z_{lt}\right).$$

When $s \neq t$, then i, j, k, l are all distinct and hence $$E(Z_{is} Z_{js} Z_{kt} Z_{lt}) = 1/m^4.$$

When $s = t$ then $$E(Z_{is} Z_{js} Z_{kt} Z_{lt}) = \begin{cases} 1/m^4, & \text{if } \{i,j,k,l\} \text{ are 4 distinct elements;} \\ 1/m^3, & \text{if } \{i,j,k,l\} \text{ are 3 distinct elements;} \\ 1/m^2, & \text{if } \{i,j,k,l\} \text{ are 2 distinct elements.} \end{cases}$$

Summing over all possible choices, $$E(X^2) = 2\binom{m}{2}\frac{6}{m^4}\binom{n}{4} + m\left(\frac{6}{m^4}\binom{n}{4} - \frac{6}{m^3}\binom{n}{3} - \frac{1}{m^2}\binom{n}{2}\right).$$

Using the result of the previous lemma, after some simple algebraic manipulation, we obtain $$\text{Var}(X) = \frac{n^2}{2m} + O(1).$$

as $n \to \infty$ and $m = \beta n$ for a constant $\beta$.

THE MARKOV AND CHEBYCHEV INEQUALITIES

We will be using the following elementary inequalities from probability theory in our analysis.

Theorem 3

(Markov Inequality)

Let X be a positive random variable. Let $c > 1$. Then $$Pr(X > cE(X)) \leq 1/c.$$

Theorem 4

(Chebyshev Inequality)

Let X be a random variable. Then $$Pr(|X - E(X)| \geq c) \leq \text{Var}(X)/c^2.$$

DETAILED ANALYSIS

In this section, we describe the details of the multi-level adaptive hashing scheme and present its analysis. Let the number of elements hashed be n. We use k tables, where the size of the ith table is $\beta_i n$. ($\beta_i$, $1 \leq i \leq k$ will be specified later.) Each table has an associated threshold parameter $\gamma_i$ to be determined later. Whenever the number of elements that percolate from table i exceeds $\gamma_i n$, we compute new hash functions for tables i through k. We set $\gamma_k < 1/n$. In other words, we guarantee that there are no percolations from the last table. (In the actual implementation we need to rehash only if there is a collision in the last table.)

Let $X_i$ be the number of keys percolating into table i. Since the number of percolations is bounded by the number of pairwise collisions, lemma 1 gives $$E(X_{i-1}) \leq \frac{X_i^2}{2\beta_i n} \qquad (4)$$

We are interested in the probability that $X_{i-1}$ is greater than $\delta_i E(X_i)$ for some suitably chosen $\delta_i > 1$.

We assume recursively that $X_i \leq \gamma_{i-1} n$, with $\gamma_0 = 1$. Given a choice of the parameters $\delta_i$ and $\gamma_i$ we will find a hash function such that $$X_{i-1} \leq \frac{\delta_i \gamma_{i-1}^2 n^2}{2\beta_i n} = \frac{\delta_i \gamma_{i-1}^2}{2\beta_i} n, \quad i > 1. \qquad (5)$$

Recursively, we will find hash functions such that $$X_i < \left(\frac{\delta_{i+1}}{2\beta_{i+1}}\right)\left(\frac{\delta_i}{2\beta_i}\right)^2 \left(\frac{\delta_{i-1}}{2\beta_{i-1}}\right)^4 \cdots \left(\frac{\delta_1}{2\beta_1}\right)^{2^{i-1}} n. \qquad (6)$$

Therefore, to obtain $X_{k-1} < 1$ (that is $X_{k-1} = 0$, which means that there are no collisions in the last table), we must choose k, $\beta_1, \ldots, \beta_k$ and $\delta_1, \ldots, \delta_k$ such that $$\Delta = \left(\frac{2\beta_k}{\delta_k}\right)\left(\frac{2\beta_{k-1}}{\delta_{k-1}}\right)^2 \cdots \left(\frac{2\beta_1}{\delta_1}\right)^{2^{k-1}} > n. \quad (7)$$

For $1 \leq i \leq k-1$, the recursion for $\gamma_i$ is $$\gamma_i = \frac{\delta_i}{2\beta_i} \gamma_{i-1}^2. \quad (8)$$

and the implied choices for $\gamma_i$ are $$\gamma_0 = 1$$

$$\gamma_i = \frac{\delta_i \delta_{i-1}^2 \delta_{i-2}^4 \cdots \delta_1^{2^{i-1}}}{\beta_i \beta_{i-1}^2 \beta_{i-2}^4 \cdots \beta_1^{2^{i-1}}} \frac{1}{2^{2^i-1}} \quad i = 1, \ldots, k. \quad (9)$$

The total memory usage is $m = (\beta_1 + \beta_2 + \ldots + \beta_n)n$. For a given total memory usage, i.e. a given value for $m$, the quantity $\Delta$ is maximized by taking $$\beta_i = \frac{2^{k-i}}{2^k - 1} \frac{m}{n} = \frac{2^{k-i}}{(2^k - 1)\alpha}. \quad (10)$$

With these choices, $\Delta$ becomes $$\Delta = \frac{2^{(2^k-1)2(\Sigma_1^k (k-i)2^{k-i})}}{(2^k-1)^{(2^k-1)}\alpha^{(2^k-1)}} \frac{1}{\Pi_{1 \leq i \leq k} \delta_i^{2^{k-i}}}$$

$$= \frac{2^{k2^k}}{(2\alpha(2^k-1))^{2^k-1}} \frac{1}{\Pi_{1 \leq i \leq k} \delta_i^{2^{k-i}}}$$

$$= \frac{2^k}{(2\alpha(1 - 1/2^k))^{2^k-1}} \frac{1}{\Pi_{1 \leq i \leq k} \delta_i^{2^{k-i}}}. \quad (11)$$

Now, we must choose the $\delta_i$'s so as to minimize the total number of rehashings and still have $\Delta > n$.

We begin by obtaining a bound on the total number of rehashings. For the purpose of this analysis we assume that we do not allow threshold violations on any level, although in practice we need to rehash only if there is a collision in the last table. Then there are two situations in which we need to replace the hash function in table i. The first is when the last insertion resulted in a threshold violation on level i, that is when $X_{j+1} \leq \gamma_i n$ for $j = 1, \ldots, i-1$ but $X_{i-1} > \gamma_i n$. The second situation is when the set of elements stored in table i has changed due to a threshold violation in some table $j < i$ and the replacement of the hash functions $h_j, h_{j-1}, \ldots, h_{i-1}$.

Given that $X_i \leq \gamma_{i-1} n$, let $P_i$ be the probability that $X_{i-1} \geq \gamma_i n$. We claim that the expected number of threshold violations on level i between successive threshold violations on lower levels is bounded by $1/(1-1/P_i)$. Indeed, let $t_1$ and $t_2$ be the times of successive violations on levels less than i. Let $X_i$ be the set of elements that percolate into table i at time $t_2 - 1$. By assumption $|X_i| \leq \gamma_{i-1} n$. Therefore, the expected number of hash functions $h_i$ that need to be tried to find a hash function $h_i^*$ that satisfies $X_{i-1} \leq \gamma_i n$ on input $X_i$ is less than by $1/(1-1/P_i)$. On the other hand, once $h_i^*$ is found, there will be no additional threshold violations on level i between times $t_1$ and $t_2$.

Let $R_i$ be the total number of rehashings at levels 1 through i and let R be the number of crises (collisions in the last table). By the previous argument $E(R_1) = 1/(1-1/P_1)$. Inductively, we have $E(R_i) \leq R_{i-1}(1/(1-1/P_i))$, and therefore $E(R_i) \leq E(R_{i-1})(1/(1-1/P_i))$. Hence, the expected number of crises is bound by $$E(R) \leq E(R_k) \leq \prod_{1 \leq i \leq k} \frac{1}{1 - p_i}. \quad (12)$$

We now obtain bounds on the expected number of rehashings in two cases: (1) the hash functions are chosen from a universal class, and (2) the hash functions are chosen from a k-universal class, $k \geq 4$.

In both cases, as an approximation of the optimum choice, we take $$\delta_i = 1 + \frac{\epsilon}{k} 2^i. \quad (13)$$

where $\epsilon$ is the largest value that satisfies the condition $\Delta > n$, that is (via equation 11))

$$\frac{2^k}{(2\alpha(1 - 1/2^k))^{2^k-1}} \prod_{1 \leq i \leq k}\left(1 + \frac{\epsilon}{k} 2^i\right)^{-2^{k-i}} > n \quad (14)$$

For a rough estimate of $\epsilon$ observe that $$\Delta \geq \frac{(2^k-1)e}{(2\alpha)^{2^k-1}} \frac{1}{\prod_{1 \leq i \leq k} \delta_i^{2^{k-i}}}. \quad (15)$$

and also that $$\delta_i^{2^{k-i}} = \left(1 + \frac{\epsilon 2^k}{k} \frac{1}{2^{k-i}}\right)^{2^{k-i}} < e^{\epsilon 2^k/k}. \quad (16)$$

Plugging equation (16) in equation (15) we obtain that $$\Delta \leq \frac{(2^k-1)e}{(2\alpha)^{2^k-1}e^{\epsilon 2^k}}.$$

Therefore it suffices to choose $\epsilon$ such that $$\frac{(2^k-1)e}{(2\alpha)^{2^k-1}e^{\epsilon 2^k}} = n. \quad (17)$$

HASH FUNCTIONS FROM A k-UNIVERSAL CLASS, $k \geq 2$

In order to bound $P_i$, the probability that $X_{i-1} \geq \gamma_i n$, given that $X_{i-1} \geq \gamma_{i-1} n$, we use the Markov inequality (theorem 1). Since $E(X_{i-1}) = X_i^2/(2\beta_i n)$, for any $\delta_i > 1$, $$Pr\left(X_{i-1} \geq \frac{\delta_i X_i^2}{2\beta_i n}\right) \leq \frac{1}{\delta_i}. \quad (18)$$

Therefore, the expected number of trials necessary to find a hash function that satisfies $$X_{i-1} \leq \frac{\delta_i X_i^2}{2\beta_i n} \leq \gamma_i n$$

is at most $1/(1-1/\delta_i)$.

$$E(R) \leq \prod_{1 \leq i < k} \frac{\delta_i}{\delta_i - 1} = \prod_{1 \leq i < k} \left(1 + \frac{k}{\epsilon} 2^{-i}\right)$$

$$\leq \prod_{1 \leq i \leq \ln\left(\frac{k}{\epsilon}\right)} \left(1 + \frac{k}{\epsilon} 2^{-i}\right) \prod_{\ln\left(\frac{k}{\epsilon}\right) \leq i \leq k} \left(1 + \frac{k}{\epsilon} 2^{-i}\right)$$

$$\leq \left(1 + \frac{k}{2\epsilon}\right)^{\ln\left(\frac{k}{\epsilon}\right)} \prod_{\ln\left(\frac{k}{\epsilon}\right)+1 < i \leq k} e^{k2^{-i/\epsilon}} \leq e^2 \left(1 + \frac{k}{2\epsilon}\right)^{\ln\left(\frac{k}{\epsilon}\right)}$$

Note that for large n, we take $k = O(\log\log n)$ and the above formula is $o(\log n)$.

HASH FUNCTIONS FROM A k-UNIVERSAL CLASS, $k \geq 4$

This time, in order to bound $P_i$, the probability that $X_{i-1} \geq \delta_i X_i$, we use the Chebychev inequality (Theorem 2) and apply Lemma 2 ignoring the error term.

$$p_i = Pr(X_{i-1} \geq \gamma_i n | X_i \leq \gamma_{i-1} n) \quad (20)$$

$$\leq \frac{(\gamma_{i-1} n)^2}{2\beta_i n} \left(\frac{2\beta_i n}{(\delta_i - 1)\gamma_{i-1}^2 n^2}\right)^2$$

$$= \frac{2\beta_i}{(\delta_i - 1)^2 \gamma_{i-1}^2 n}$$

Let $q_i$ be the above bound on $P_i$. Then $$\frac{q_{i-1}}{q_i} = \frac{\beta_{i-1}(\delta_i - 1)^2 \gamma_{i-1}^2}{\beta_i (\delta_{i-1} - 1)^2 \gamma_i^2} \quad (21)$$

Using the recursive definition (equation (8)) for $\gamma_i^2$ and $\gamma_{i-1}^2$ and using the choices for $\delta_i$ given by equation (13), we obtain that $$\frac{q_{i-1}}{q_i} = \frac{\beta_{i-1}}{\beta_i} \frac{(\delta_i - 1)^2}{(\delta_{i-1} - 1)^2} \frac{2\beta_i \gamma_i}{\delta_i} \frac{\delta_{i-1}}{2\beta_{i-1}\gamma_{i-1}} \quad (22)$$

$$= \frac{2^{2i}}{2^{2(i-1)}} \left(\frac{1 - \frac{\epsilon}{k} 2^{i-1}}{1 - \frac{\epsilon}{k} 2^i}\right) \frac{\gamma_i}{\gamma_{i-1}}$$

$$\leq \frac{1}{2} \frac{\gamma_i}{\gamma_{i-1}}$$

Since $q_1 = 2\beta_1/((\delta_1 - 1)^2 n)$, $\gamma_1 = \delta_1/(2\beta_1)$ and $\delta_1 = 1 + 2\epsilon/k$.

$$q_1 = \frac{1}{\gamma_1} \left(1 - \frac{2\epsilon}{k}\right) \left(\frac{k}{2\epsilon}\right)^2 \frac{1}{n}. \quad (23)$$

and hence by induction $$q_i = \frac{1}{2^{i-1}\gamma_1} \left(1 - \frac{2\epsilon}{k}\right) \left(\frac{k}{2\epsilon}\right)^2 \frac{1}{n}. \quad (24)$$

Hence the expected number of crises is bounded by $$E(R) = \prod_{1 < i \leq k} \frac{1}{1 - p_i} \leq 1 + \sum_{1 \leq i < k} p_i$$

$$\leq 1 + \sum_{1 \leq i < k} \frac{1}{2^{i-1}\gamma_1} \left(1 - \frac{2\epsilon}{k}\right) \left(\frac{k}{2\epsilon}\right)^2 \frac{1}{n}.$$

Since the $\gamma_i$'s are decreasing doubly exponentially, the sum is dominated by the last term and our choice for $\epsilon$ makes $\gamma_k \approx 1/n$. Hence $$E(R) \leq 1 - \frac{1}{2^{k-1}} \left(1 - \frac{2\epsilon}{k}\right) \left(\frac{k}{2\epsilon}\right)^2. \quad (25)$$

For $n \to \infty$, this is just $O(1)$.

COLLISIONS VERSUS PERCOLATIONS

In all of our analysis, we bound the number of percolations by the number of collisions. Can it be that the former is actually much smaller? The answer is no; the distribution of these two random variables is quite similar, at least if the hash functions distribute keys uniformly at random.

Consider n elements being hashed into a table of size m uniformly at random. Define the indicator variable $Z_l$ by $$Z_l = \begin{cases} 1 & \text{if location } l \text{ is empty;} \\ 0 & \text{otherwise.} \end{cases} \quad (26)$$

Define $$Z = \sum_{1 \leq l \leq m} Z_l. \quad (27)$$

that is Z counts the number of empty slots in the table.

Let Y be the number of elements percolating from the table. Plainly, $$Y = n - m - Z. \quad (28)$$

On the other hand $E(Z_l) = (1 - 1/m)^n$ and hence $E(Z) = m(1 - 1/m)^n$ so finally $$E(Y) = n - m - m(1 - 1/m)^n. \quad (29)$$

As $n \to \infty$, if $m = \beta n$ for a constant $\beta$, then $$E(Z) = \beta n \left(1 - \frac{1}{\beta n}\right)^n = \beta n e^{-1/\beta} + O(1/n).$$

Hence $$E(Y) = (\beta - 1 + \beta e^{-1/\beta})n + O(1) \quad (30)$$

$$\geq \left(\frac{1}{2\beta} - \frac{1}{6\beta^2}\right)n + O(1).$$

Comparing this with the expected number of collisions (Lemma 1), we see that the relative difference is about $1/(2\beta)$ which is quite small.

For the variance, we start by noticing that $$\text{Var}(Y) = \text{Var}(Z) \quad (31)$$

On the other hand, $$E(Z^2) = E\left(\left(\sum_{1 \leq a \leq m} Z_l\right)^2\right) = \quad (32)$$

$$\sum_{1 \leq a \leq m} E(Z_l^2) + \sum_{\substack{1 \leq a,t \leq m \\ a \neq t}} E(Z_s \cdot Z_t)$$

$$= m\left(1 - \frac{1}{m}\right)^n + 2\binom{m}{2}\left(1 - \frac{2}{m}\right)^n.$$

By definition, $$\text{Var}(Z) = E(Z^2) - E(Z)^2.$$

Hence, when $n \to \infty$ and $m = \beta n$ for a constant $\beta$, $$\text{Var}(Z) = (\beta e^{-1/\beta} - (1 + \beta)e^{-2/\beta})n + O(1)$$

$$\geq \left(\frac{1}{2\beta} - \frac{5}{6\beta^2}\right)n + O(1).$$

Comparing this with the variance of the number of collisions (Lemma 2), we see that the relative difference is about $5/(3\beta)$, which again is quite small.

A DESIGN EXAMPLE

Using the above relationships, the design process for a typical example of a system using the invention is as follows:

The number of keys is $n = 2^{16} = 65536$.

We choose a load factor $\alpha = 1/7.5$

We choose the number of tables k to be 4. With these choices the size of the tables is $4n = 262144$, $2n = 131072$, $n = 65536$, and $n/2 = 32768$.

Using equation (14), we determine that $\epsilon = 1.430597313$ is suitable.

Hence the thresholds $\gamma_i n$ for $i = 0, \ldots, 4$ are 65536, 14051, 1830, 98, 0.

With these values, the expected number of crises from the first line of equations (19) satisfies $E(R) \leq 6.4591$. (The approximate bound on the expected number of crises given by the third line of equations (19) gives $E(R) \leq 18.1616$.)

If we were to use 4-universal hash functions, then the expected number of crises (given by plugging equation (20) into equation (12)) satisfies $E(R) \leq 1.2655$. (Using the exact expression for the variance at each level gives the better bound $E(R) \leq 1.2622$ and using the approximation (25) gives the worse bound $E(R) \leq 1.4191$.)

We simulated our hashing algorithm for this example in two situations: (a) we chose a fixed set of $2^{16}$ random keys and tried the hashing algorithm with different random linear hash functions 100 times, and (b) we took a fixed set of $2^{16}$ consecutive keys and tried the hashing algorithm with different random linear hash functions 100 times.

Surprisingly, in both cases it was never necessary to rehash. Let $X_i$ denote the average number of elements percolating into table i in the 100 trials and let $X_{i,max}$ denote the maximum number of elements percolating into table i over the 100 trials.

In case (a), the average percolations were $\overline{X}_1 = 65536$ $\overline{X}_2 = 7534.78$ $\overline{X}_3 = 211.35$ $\overline{X}_4 = 0.22$ $\overline{X}_5 = 0$, and the maximum percolations were $X_{1,max} = 65536$ $X_{2,max} = 7764$ $X_{3,max} = 242$ $X_{4,max} = 3$ $X_{5,max} = 0$.

Note that by equation (29)

$E(X_2 | X_1 = 65536$ and $\beta_1 n = 262144) = 7549.77$ $E(X_3 | X_2 = 7535$ and $\beta_2 n = 131072) = 212.46$ $E(X_4 | X_3 = 212$ and $\beta_3 n = 65536) = 0.34$ $E(X_5 | X_4 = 3$ and $\beta_4 n = 32768) = 0.00009$, so in this case the average behavior is close to the expected behavior using uniform random hash functions.

In case (b), the average percolations were $\overline{X}_1 = 65536$ $\overline{X}_2 = 5439.87$ $\overline{X}_3 = 220.66$ $\overline{X}_4 = 0$ $\overline{X}_5 = 0$, and the maximum percolations were $X_{1,max} = 65536$ $X_{2,max} = 45056$ $X_{3,max} = 8192$ $X_{4,max} = 0$ $X_{5,max} = 0$.

In case (b) despite the fact that at least once $X_3$ was far above the threshold (8192 versus 1830), there was no percolation into table 4. The reason is the very special structure of the input in this case; using our hash functions, in the typical case, the number of percolations is very small but in the worst case this number is far above the average.

It is readily apparent that the results of the simulation are far better than the theoretical bounds that we obtained. There are several reasons:

For such large values of n, the hash functions behave as if they were distributing keys independently and uniformly at random. Therefore, their behavior is closer to the analysis in the discussion of hash functions from a k-universal class, $k \geq 4$ and in the discussion of collisions versus percolations.

If the hash functions are independent and uniform, the Chebychev bound for large deviations is very weak. In fact, it is extremely likely that the number of percolations is within a few standard deviations of the expected number of percolations.

We make a worst case assumption at every level in determining our choices for the threshold at the next level. Once the percolation from the first table is close to the average and thus far under the threshold, percolation on subsequent levels is vastly overstimated. Hence the overestimation of the actual percolation is compounded (double exponentially).

Furthermore, since hash functions at different levels are chosen independently, the likelihood of several "bad" hash functions is very small.

It should be apparent to those skilled in the art that various changes in form and details of the invention as shown and described may be made. For example, the system and method could be used to handle insertion and removal of data from tables in a complex database management environment. It is intended that such changes be included within the spirit and scope of the claims appended hereto.

What is claimed is:

1. A local area network system, comprising:

a plurality of local area networks interconnected by means of a bridge, said bridge including a processor, program memory, address memory and packet memory, said memories being connected to said processor by a bus, a plurality of interfaces, each of said interfaces connecting said bus to one of said local area networks, said address memory being divided into a plurality of sequentially ordered tables, each said table including means for storing keys at specified locations;

hashing means connected to each of said tables for hashing a specified key using a different hash function for each of said tables so as to generate a hash table address corresponding to each of said tables;

lookup means, coupled to said hashing means and to each of said tables, for determining whether the location in each of said tables at the corresponding hash table address generated by said hashing means is occupied; and storing means coupled to said lookup means and said tables for storing said specified key in a first one of said sequentially ordered tables which contains an unoccupied location at said corresponding hash table address;

said lookup means including retrieval means for retrieving stored keys by reading said tables in parallel at locations corresponding to said hash table addresses generated by said hashing means and outputting only stored keys corresponding to a specified key; and rehashing means, coupled to said lookup means and said tables, for detecting when all of said locations in said tables corresponding to said hash table addresses for a specified key are occupied, and whenever all of said locations for a specified key are occupied, and generating new hash functions for at least a subset of said tables and rearranging the keys stored in said subset of said tables according to the new hash functions;

whereby said rehashing means guarantees that said lookup means can retrieve any key stored in said tables with a single parallel read.

2. The local area network system of claim 1 in which the hash functions are of the form $$((A \cdot K - B) \bmod P1) \bmod P2)$$

where K is a specified key, A and B are randomly selected polynomials, P1 is a fixed irreducible polynomial, and P2 is a fixed polynomial.

3. A local area network system, comprising:

a plurality of local area networks interconnected by means of a bridge, said bridge including a processor, program memory, address memory and packet memory, said memories being connected to said processor by a bus, a plurality of interfaces, each of said interfaces connecting said bus to one of said local area networks, said address memory being divided into a plurality of sequentially ordered tables, each said table including means for storing keys at specified locations;

hashing means connected to each of said tables for hashing a specified key using a different hash function for each of said tables so as to generate a hash table address corresponding to each of said tables;

lookup means, coupled to said hashing means and to each of said tables, for determining whether the location in each of said tables at the corresponding hash table address generated by said hashing means is occupied;

storing means coupled to said lookup means and said tables for storing said specified key in a first one of said sequentially ordered tables which contains an unoccupied location at said corresponding hash table address; and rehashing means, coupled to said lookup means and said tables, for detecting when all of said locations in said tables corresponding to said hash table addresses for a specified key are occupied, and for generating new hash functions for at least a subset of said tables and for rearranging the keys stored in said subset of said tables according to the new hash functions;

said lookup means including retrieval means for retrieving stored keys by reading said tables in parallel at locations corresponding to said hash table addresses generated by said hashing means and outputting only stored keys corresponding to a specified key;

wherein said tables include first and second sets of tables, said hashing means includes first and second hashing means each using a distinct set of hashing functions, said system including separate lookup and rehashing means for each of said first and second sets of tables, means for storing each said specified key in both said first and second sets of tables, and means, coupled to said rehashing means for said first and second sets of tables, for using said second set of tables and for rehashing said first set of tables when all of said locations in said first set of tables for a specified key are occupied.

4. A data processing system for on-line insertions, deletions and look-up operations, comprising:

a processor, program memory, and data memory, said memories being connected to said processor by a bus, said data memory including a plurality of sequentially ordered tables, each said table including means for storing keys at specified locations;

hashing means connected to each of said tables for hashing a specified key using a different hash function for each of said tables so as to generate a hash table address corresponding to each of said tables;

lookup means, coupled to said hashing means and to each of said tables, for determining whether the location in each of said tables at the corresponding hash table address generated by said hashing means is occupied; and storing means coupled to said lookup means and said tables for storing said specified key in a first one of said sequentially ordered tables which contains an unoccupied location at said corresponding hash table address;

said lookup means including retrieval means for retrieving stored keys by reading said tables in parallel at locations corresponding to said hash table addresses generated by said hashing means and outputting only stored keys corresponding to a specified key; and rehashing means, coupled to said lookup means and said tables, for detecting when all of said locations in said tables corresponding to said hash table addresses for a specified key are occupied, and, whenever all of said locations for a specified key are occupied, generating new hash functions for at least a subset of said tables, and rearranging the keys stored in said subset of said tables according to the new hash functions; whereby said rehashing means quarantees that said lookup means can retrieve any key stored in said tables with a single parallel read.

5. The data processing system of claim 4, wherein said hash functions are of the form $$((A \cdot K + B) \bmod P1) \bmod P2)$$

where K is a specified value, A and B are randomly selected polynomials, P1 is a fixed irreducible polynomial, and P2 is a fixed polynomial.

6. A data processing system for on-line insertions, deletions and look-up operations, comprising:

a processor, program memory, and data memory, said memories being connected to said processor by a bus, said data memory including a plurality of sequentially ordered tables, each said table including means for storing keys at specified locations;

hashing means connected to each of said tables for hashing a specified key using a different hash function for each of said tables so as to generate a hash table address corresponding to each of said tables;

lookup means, coupled to said hashing means and to each of said tables, for determining whether the location in each of said tables at the corresponding hash table address generated by said hashing means is occupied;

storing means coupled to said lookup means and said tables for storing said specified key in a first one of said sequentially ordered tables which contains an unoccupied location at said corresponding hash table address; and rehashing means, coupled to said lookup means and said tables, for detecting when all of said locations in said tables corresponding to said hash table addresses for a specified key are occupied, and for generating new hash functions for at least a subset of said tables and for rearranging the keys stored in said subset of said tables according to the new hash functions;

said lookup means including retrieval means for retrieving stored keys by reading said tables in parallel at locations corresponding to said hash table addresses generated by said hashing means and outputting only stored keys corresponding to a specified key;

wherein said tables include first and second sets of tables, said hashing means includes first and second hashing means each using a distinct set of hashing functions, said system including separate lookup and rehashing means for each of said first and second sets of tables, means for storing each said specified key in both said first and second sets of tables, and means, coupled to said rehashing means for said first and second sets of tables, for using said second set of tables and for rehashing said first set of tables when all of said locations in said first set of tables for a specified key are occupied.

7. A data processing method, comprising the steps of:

providing a data storage memory including a plurality of sequentially ordered tables, each said table storing data at specified locations;

providing data processing means coupled to said data storage means for storing and retrieving data values to and from said tables and for hashing specified values using different hash function for each said table to generate table addresses corresponding to each said table;

storing each of a plurality of values in said tables, said storing step including the steps of:

hashing a specified value using a different hash function for each of said tables so as to generate a hash table address corresponding to each of said tables;

accessing a location in each said table corresponding to said corresponding hash table address and determining whether said location is occupied; and storing said specified value in a first one of said tables, in accordance with a predefined sequential ordering of said tables, which contains an unoccupied location at said corresponding hash table address;

retrieving a specified data value from said tables, said retrieving step including the steps of hashing said specified data value using said different hash function for each of said tables so as to generate a hash table address corresponding to each said table, reading said tables in parallel at locations corresponding to said hash table addresses, and outputting only data retrieved from said tables corresponding to said specified data value;

detecting when all of said locations in said tables corresponding to said hash table addresses for a specified value are occupied; and whenever all of said locations for a specified value are occupied, generating new hash functions for at least a subset of said tables, and rearranging the values stored in said subset of said tables according to said new hash functions;

whereby said step of generating new hash functions guarantees that said retrieving step will retrieve any value stored in said tables with a single parallel read.

8. The data processing method of claim 7, wherein said hash functions are of the form $$((A \cdot K + B) \bmod P1) \bmod P2)$$

where K is a specified key, A and B are randomly selected polynomials, P1 is a fixed irreducible polynomial, and P2 is a fixed polynomial.

9. A data processing method, comprising the steps of:

providing a data storage memory including a plurality of tables, each said table storing data at specified locations;

providing data processing means coupled to said data storage means for storing and retrieving data values to and from said tables and for hashing specified values using different hash function for each said table to generate table addresses corresponding to each said table;

storing each of a plurality of values in said tables, said storing step including the steps of:

hashing a specified value using a different hash function for each of said tables so as to generate a hash table address corresponding to each said table;

accessing a location in each said table corresponding to said corresponding hash table address and determining whether said location is occupied; and storing said specified value in a first one of said tables, in accordance with a predefined sequential ordering of said tables, which contains an unoccupied location at said corresponding hash table address;

retrieving a specified data value from said tables, said retrieving step including the steps of hashing said specified data value using said different hash function for each of said tables so as to generate a hash table address corresponding to each said table, reading said tables in parallel at locations corresponding to said hash table addresses, and outputting only data retrieved from said tables corresponding to said specified data value;

detecting when all of said locations in said tables corresponding to said hash table addresses for a specified value are occupied, and generating new hash functions for at least a subset of said tables and rearranging the keys stored in said subset of said tables according to said new hash functions;

said first providing step including the step of providing first and second sets of said tables, said hashing step including hashing said specified value using two distinct sets of hashing functions for said first and second sets of said tables, said storing steps including the steps of storing each said specified value in both said first and second sets of tables, and said method including the steps of using said second set of tables to retrieve specified data values while performing said generating new hash functions step on said first set of tables when said detecting step detects that all of said locations in said first set of tables for a specified value are occupied.

10. A data processing system for on-line insertions, deletions and look-up operations, comprising:

a processor, program memory, and data memory, said memories being connected to said processor by a bus, said data memory including a plurality of sequentially ordered tables, each said table including means for storing keys at specified locations; wherein the maximum number of keys which can be stored in each of said tables monotonically decreases through said sequentially ordered tables;

hashing means connected to each of said tables for hashing a specified key using a different hash function for each of said tables so as to generate a hash table address corresponding to each of said tables;

lookup means, coupled to said hashing means and to each of said tables, for determining whether the location in each of said tables at the corresponding hash table address generated by said hashing means is occupied; and storing means coupled to said lookup means and said tables for storing said specified key in a first one of said sequentially ordered tables which contains an unoccupied location at said corresponding hash table address;

said lookup means including retrieval means for retrieving stored keys by reading said tables in parallel at locations corresponding to said hash table addresses generated by said hashing means and outputting only stored keys corresponding to a specified key; and rehashing means, coupled to said lookup means and said tables, for detecting when all of said locations in said tables corresponding to said hash table addresses for a specified key are occupied, and, whenever all of said locations for a specified key are occupied, generating new hash functions for at least a subset of said tables and rearranging the keys stored in said subset of said tables according to the new hash functions; whereby said rehashing means guarantees that said lookup means can retrieve any key stored in said tables with a single parallel read.

11. A data processing method, comprising the steps of:

providing a data storage memory including a plurality of sequentially ordered tables, each said table storing data at specified locations; wherein the number of said locations in which data which can be stored in each of said tables monotonically decreases through said sequentially ordered tables;

providing data processing means coupled to said data storage means for storing and retrieving data values to and from said tables and for hashing specified values using different hash function for each said table to generate table addresses corresponding to each said table;

storing each of a plurality of values in said tables, said storing step including the steps of:

hashing a specified value using a different hash function for each of said tables so as to generate a hash table address corresponding to each of said tables;

accessing a location in each said table corresponding to said corresponding hash table address and determining whether said location is occupied; and storing said specified value in a first one of said tables, in accordance with a predefined sequential ordering of said tables, which contains an unoccupied location at said corresponding hash table address;

retrieving a specified data value from said tables, said retrieving step including the steps of hashing said specified data value using said different hash function for each of said tables so as to generate a hash table address corresponding to each said table, reading said tables in parallel at locations corresponding to said hash table addresses, and outputting only data retrieved from said tables corresponding to said specified data value;

detecting when all of said locations in said tables corresponding to said hash table addresses for a specified value are occupied; and whenever all of said locations for a specified value are occupied, generating new hash functions for at least a subset of said tables, and rearranging the values stored in said subset of said tables according to said new hash functions;

whereby said step of generating new hash functions guarantees that said retrieving step will retrieve any value stored in said tables with a single parallel read.

* * * * *